United States Patent Office 3,453,357
Patented July 1, 1969

3,453,357
VULCANIZATION OF ELASTOMERIC FIBERS
Lawrence J. Logan, Jr., Wilmington, Del., assignors to Hercules Incorporated, Wilmington, Del., a corporation of Delaware
No Drawing. Continuation-in-part of application Ser. No. 519,438, Jan. 10, 1966. This application Dec. 13, 1966, Ser. No. 601,299
Int. Cl. B29c 25/00
U.S. Cl. 264—236      8 Claims

ABSTRACT OF THE DISCLOSURE

A process wherein curing of an elastomeric fiber is effected by treating the fiber in an atmosphere of vulcanizing or cross-linking agent. The fiber can be spun without any curative included therein and all of the curative supplied from the treating environment. Optionally curative can be included during spinning, so that the environment of curative serves primarily to provide a sufficient partial pressure to prevent escape of the curative when the temperature is raised to that needed for the curing reaction.

---

This application is a continuation-in-part of application Ser. No. 519,438, filed Jan. 10, 1966, and now abandoned.

This invention relates to a process for producing elastomeric fibers and more particularly to a process of producing elastomeric fibers from epihalohydrin polymers by melt-spinning and then vulcanizing the spun filament.

It is now well known that amorphous epihalohydrin polymers can be produced that have outstanding elastomeric properties. As with other rubbers, it is necessary to vulcanize (cross-link) the polymer for most use applications. An important application of the epihalohydrin rubbers is in the production of synthetic fibers. Some of these epihalohydrin polymers contain ethylenic unsaturation and hence are capable of sulfur vulcanization. These polymers can be compounded with standard sulfur vulcanization recipes and then spun into fibers which are cured by heat.

Unlike polymers which contain ethylenic unsaturation, and hence are capable of sulfur vulcanization, the epihalohydrin polymers containing no ethylene unsaturation must be vulcanized by agents which effect crosslinking by chemical reaction of the agent with the halomethyl group of the epihalohydrin monomer units, as for example, by reaction of a polyamine with the halogen of such groups. However, when these epihalohydrin polymers are compounded with the cross-linking agent prior to extrusion of the polymer into filaments, several types of problems have been encountered. For example, in many cases, the heat required for extrusion of the composition results in pre-curing of the polymer within the extruder with the result that the polymer either cannot be extruded or can be extruded only with difficulty, producing severe extrudate fracture and surface roughness so that only low quality filaments are produced. In cases where the curative can withstand the extrusion temperature, it has been found that the surface area of the fibers is so great that a substantial portion of the curative sublimes or otherwise escapes from the fibers during the curing step.

Now in accordance with this invention, it has been discovered that elastomeric fibers can be prepared from the saturated epihalohydrin polymers by extruding the polymer into the form of filaments and then heating the filaments in a medium containing a cross-linking agent selected from the group consisting of ammonia, hydrogen sulfide and polyamines, whereby the polymer in crosslinked.

The process of the invention is applicable to filaments prepared without a curative compounded therein as well as to those containing the curative. When the extruded filaments contain no curing agent, the entire curing is effected by the curative in the heated medium. When the curing agent is incorporated in the polymer compound prior to extrusion, the curative in the heated medium serves to generate the partial pressure necessary to prevent the sublimation or diffusion of the curative out of the filaments. The elastomeric fibers produced by either embodiment have excellent physical properties.

Any high molecular weight, solid, elastomeric polymer of an epihalohydrin, including both homopolymers and copolymers with one another or with one or more other epoxides which are free of ethylenic unsaturation, can be used for the preparation of elastomeric fibers in accordance with this invention. Exemplary of the epihalohydrin polymers that can be used are the amorphous poly(epihalohydrin)s described and claimed in U.S. 3,158,580 and the epihalohydrin copolymers with alkylene oxides and alkyl glycidyl ethers described and claimed in U.S. 3,158,581. In addition to those wholly amorphous polymers, there can be used in the instant invention mixtures of amorphous and crystalline polymers, but for most elastomeric fiber uses the amount of crystallinity in the mixture will be less than about 25 to 30%. Typical of the epihalohydrin polymers that can be used are poly(epichlorohydrin), poly(epibromohydrin), epichlorohydrin—epibromohydrin copolymer, and copolymers of epichlorohydrin and epibromohydrin with alkylene oxides such as ethylene oxide, propylene oxide, butene-2 oxides, butene-1 oxide, hexene-1 oxide, hexene-2 oxide, cyclohexane oxide; phenyl alkylene oxides such as styrene oxide, etc., and glycidyl ethers such as methyl glycidyl ether, ethyl glycidyl ether, methylethyl glycidyl ether, butyl glycidyl ether, phenyl glycidyl ether, etc., and mixtures of any two or more of such epoxides, which polymers are solid, largely amorphous polymers with reduced specific viscosities of at least about 0.2 as measured on a 0.1% solution in $\alpha$-chloronaphthalene at 100° C.

The epihalohydrin polymers described above are readily prepared by polymerization of said epoxides with organoaluminum catalysts such as described and claimed in U.S. 3,219,591. They may also be prepared by the processes described and claimed in U.S. 3,135,705 and 3,135,706. They may also be prepared by polymerization of the above-mentioned type of epoxides, using modified alkylzinc compounds and modified alkylmagnesium compounds, as for example, diethylzinc reacted with 0.2 to 1.2 moles of water per mole of zinc, and diethylmagnesium reacted with 0.1 to 1.2 moles of water or 0.2 to 0.8 mole of a polyhydric alcohol or polyhydric phenol.

The epihalohydrin polymers are, in accordance with this invention, spun into filaments. Such an operation can be carried out by any of the well known melt-spinning processes, such as by the use of a screw extruder fitted with a suitable spin-head using the polymer per se or a mixture thereof with a plasticizer or solvent, etc. The temperature at which the spinning operation is carried out will, of course, depend upon the softening temperature of the polymer or polymer mixture, but generally will be within the range of from about 100° C. to about 250° C., and preferably from about 120° C. to about 200° C.

To obtain the highest tensile strengths in the final fiber, it is generally desirable to include a reinforcing filler in the elastomeric fiber formulation. Preferably, a reinforcing mineral filler, such as silica, is used, but any of the other well known reinforcing fillers can be used, as for example, aluminas, aluminum silicate, clays, titanium dioxide, carbon black, etc. Such fillers will generally be used in the amount of from about 5 to about 50 parts per hundred parts of epihalohydrin polymer, and preferably will be 10 to 40 parts per hundred parts of polymer. Other additives can also be incorporated in the fiber formulation before the fiber is spun, as for example, antioxidants, dyes, pigments, processing lubricants, acid acceptors, volatile and non-volatile plasticizers, solvents, etc. In some cases, it is desirable to incorporate a volatile solvent into the spinning formulation in order to reduce the viscosity. Exemplary of such diluents that can be so used are ketones such as acetone, methyl ethyl ketone, etc., chlorinated hydrocarbons such as methylene chloride, carbon tetrachloride, ethylene dichloride, etc., and aromatic hydrocarbons such as benzene, toluene, xylene, etc.

The filament, when it leaves the spinnerette, is then vulcanized by heating it in contact with a cross-linking (vulcanizing) agent. This can be done by winding the filament on a suitable bobbin or other package means and then placing the bobbin in an oven having an atmosphere that contains the cross-linking agent and heating, whereby vulcanization of the fiber takes place. Another method is to pass the filament, prior to winding, through a solution of, or through the vapor of, the cross-linking agent in an oven or the like at a suitable temperature, whereby cross-linking is effected. When the filaments contain curative already incorporated therein, only a slight concentration of the curative in the oven is required; i.e., only enough to prevent escape of that which is incorporated.

Various polyamines can be used as cross-linking agents for epihalohydrin polymers. Exemplary of such polyamines are aliphatic amines such as ethylenediamine, propylenediamine, tetramethylenediamine, hexamethylenediamine, diethylenetriamine, etc.; heterocyclic polyamines such as melamine, piperazine, pyrazine, etc.; aromatic amines such as p-phenylenediamine, naphthalenediamine, biphenyldiamine, etc. and polymeric amines such as poly(2-methyl-5-vinyl pyridine), etc. Instead of the free amine, a salt of the amine can be used. Internal salts of the amines can also be used as, for example, hexamethylenediamine carbamate, which type of salt decomposes to the free amine at or below the curing temperature. In addition to the polyamines, the epihalohydrin polymers can be cross-linked with a heterocyclic compound selected from the group consisting of 2-mercaptoimidazolines and 2-mercaptopyrimidines in combination with at least one metal compound selected from the group consisting of salts of aromatic carboxylic acids, salts of aliphatic carboxylic acids, salts of carbonic acid, salts of phosphorous acid, salts of silicic acid and oxides of the metals of Groups II–A, II–B and IV–A of the Periodic Table (Lang's Handbook of Chemistry, 8th edition, pages 56–57, 1952). In addition to the above cross-linking agents, urea, thiourea, ammonia and ammonium salts can also be used.

As already pointed out, these can be used in vapor phase or solution. Any diluent that is a solvent for the cross-linking agent but is a non-solvent for the epihalohydrin polymer can be used in preparing the solution of cross-linking agent. Thus, for example, water can be used for ammonia, hydrogen sulfide and many amines. For those polyamines not soluble in water, organic diluents can be used, as for example, alcohols, such as methanol, ethanol, isopropanol, etc., or aliphatic or cycloaliphatic hydrocarbons such as hexane, heptane, cyclohexane, etc. In forming these solutions, it is sometimes desirable to add a surfactant or other dispersing means.

The following examples will illustrate the process of preparing epihalohydrin polymer fibers in accordance with this invention. All parts and percentages are by weight unless otherwise indicated. By the term "reduced specific viscosity (RSV)" is meant the $\eta_{sp.}/c$ determined on a 0.1% by weight solution of the polymer in $\alpha$-chloronaphthalene at 100° C.

EXAMPLES 1 AND 2

The epihalohydrin elastomer used in this example was a 1:1 mole ratio copolymer of epichlorohydrin and ethylene oxide having a molecular weight (weight average) of about 2.8 million and an RSV of 5.0 as measured on a 0.1% solution in $\alpha$-chloronaphthalene containing 3% acetylacetone at 100° C. This copolymer was compounded using the formula:

| | Parts |
|---|---|
| Copolymer | 100 |
| Silica | 20 |
| Zinc stearate | 0.75 |
| Dioctyldecyldisulfide | 1.5 |
| Calcium oxide | 1.0 |

The silica filler used in Examples 1–4 was fumed silica, having an average particle size of about 14 millimicrons and a surface area of about 200 square meters per gram. The compounding was carried out by milling the copolymer on a two-roll mill, with both rolls heated to 149° C., adding the silica filler and zinc stearate as a process lubricant. The stock was cross-cut and end-rolled while milling for 15 minutes. The temperature of the rolls was then lowered to 93° C. and the dioctyldecyldisulfide stabilizer and calcium oxide as acid acceptor were added and thoroughly blended. After a total of 30 minutes milling, the compounded stock was taken from the rolls.

The compounded stock was fed to an extruder operating at 135° C. and was extruded through an eight-hole, 0.014-inch diameter, 0.070-inch land die. The eight strands of approximately 900 denier each were wrapped on a standard bobbin in Example 1 and on a glass mandrel in Example 2.

The bobbin in Example 1 was placed in an atmosphere of gaseous ammonia (about 75% ammonia by volume and the rest air) for one hour at 26° C. The temperature was then raised linearly, over a period of 90 minutes, to 138° C., then at 0.15° C. per minute for 60 minutes and then held at 147° C. for 30 minutes, after which the vulcanized fiber was removed and cooled.

In Example 2, the glass mandrel with the fiber wrapped thereon was placed in a vacuum oven which was heated to 149° C., purged with nitrogen and evacuated to 26 inches Hg vacuum. Hydrogen sulfide was slowly purged into the oven over a 20-minute period until the vacuum had dropped to 8.5 inches Hg vacuum and the temperature to 145° C. (about 85% hydrogen sulfide). The temperature was lowered 0.6° C. per minute for the next 100 minutes. The oven was then evacuated, purged with nitrogen and the fiber removed.

The tensile properties of the fibers so produced are set forth below:

| | Uncured | Ex. 1 | Ex. 2 |
|---|---|---|---|
| Tensile strength, p.s.i. | <100 | 1,620 | 1,520 |
| 300% modulus, p.s.i. | | 1,070 | 400 |
| Elongation to break, percent | | 350 | 820 |

EXAMPLE 3

The epichlorohydrin-ethylene oxide copolymer used in Example 1 was compounded using the following formula by milling at 160° C. for 30 minutes, the last two ingredients added during the last 2 minutes of milling.

| | Parts |
|---|---|
| Copolymer | 100 |
| Silica | 20 |
| Zinc stearate | 1.0 |
| Dioctyldecyldisulfide | 1.0 |
| Calcium oxide | 1.0 |

The compounded stock was fed to an extruder operating at 204° C. and extruded through a four-hole, 0.014 inch by 0.140 inch land die. The strands of approximately 615 denier were placed in a 25° C. aqueous solution containing 28.5% by volume of diethylene triamine and 0.06% by volume of an alkylbenzene sulfonate, a surfactant sold under the trademark "Ultra Wet." After 60 minutes immersion, the fiber was removed from the solution and then was heated at 149° C. for 30 minutes. The cured fiber so obtained had a tensile strength of 1980 p.s.i., a 300% modulus of 529 p.s.i., and an elongation to break of 695%.

EXAMPLE 4

One hundred (100) parts of the epichlorohydrin—ethylene oxide copolymer used in Example 1 was milled for 30 minutes at 149° C., then 20 parts of silica filler, 1.0 part of dioctadecyldisulfide and 1.0 part of zinc stearate were added within 5 minutes and the stock was milled for an additional 30 minutes. The compounded stock was extruded at 177° C. through an eight-hole, 0.014-inch diameter by 0.070-inch land die. The continuous filaments having deniers of about 850, were wound on aluminum-covered bobbins and placed in an oven preheated to 149° C. Ammonia gas was purged through the oven for one minute, giving an ammonia concentration of about 40% by volume. The fibers remained in the ammonia atmosphere at 149° C. for 2 hours, after which the ammonia was blown out and the bobbin removed from the oven. The cured fiber so obtained had a tensile strength of 3420 p.s.i., a 300% modulus of 224 p.s.i., and elongation to break of 1,150%.

EXAMPLES 5 AND 6

In Example 5, the epihalohydrin elastomer used was a mixture of solid, amorphous and crystalline homopolymers of epichlorohydrin containing about 16% crystalline polymer and having an RSV of 1.4, and in Example 6, the epihalohydrin elastomer composition was a 50:50 mixture of the homopolymer used in Example 5 and the copolymer used in Example 1. The elastomers were compounded using the following formula:

|  | Ex. 5 (parts) | Ex. 6 (parts) |
| --- | --- | --- |
| Poly(epichlorohydrin) | 100 | 50 |
| Epichlorohydrin—ethylene oxide copolymer |  | 50 |
| Silica | 30 | 30 |
| Zinc stearate | 1 | 1 |
| Nickel dibutyl dithiocarbamate (stabilizer) | 1 | 1 |

The silica used was fumed silica having an average particle size of about 7 m$\mu$ and a surface area of about 325 m.$^2$/g. In Example 5, the compounding was carried out by milling the homopolymer on a two-roll mill at 70°–90° C. for 2 minutes, then over a ten-minute period adding the zinc stearate and silica filler. The temperature was then raised to 116° C., the nickel stabilizer was added and the composition was thoroughly blended. In Example 6, the copolymer was milled at 165° C. for 20 minutes, the roll temperature was lowered to 70°–90° C. and the homopolymer was added. The resulting polymer blend was then compounded as described for Example 5. Each of the compounded compositions was then extruded through a screw and metering pump-type fiber extruder, utilizing a 35-hole, 0.040-inch diameter by 0.150-inch land die spinnerette and a 163° C. die temperature. Each extrudate was drawn down in a water bath at 16° C. to approximately 400 denier per filament and was taken up on a standard bobbin. The bobbins were placed in an oven, preheated to 149° C., and ammonia was purged in until the ammonia concentration was about 40% by volume with air. After 2 hours at 149° C. in this atmosphere, the fibers were removed, cooled to room temperature, and their physical properties determined, with the following results:

|  | Ex. 5 | Ex. 6 |
| --- | --- | --- |
| Tensile strength, p.s.i. | 1,900 | 3,200 |
| 300% modulus, p.s.i. | 300 | 320 |
| Elongation to break, percent | 900 | 1,050 |

EXAMPLE 7

1200 grams of a poly(epichlorohydrin) homopolymer containing about 4% crystalline polymer and having a raw polymer viscosity of 72 (ML+4 at 212° F. —ASTM Method D–1646–63) was added to a size "B" Banbury Mixer operating at 116 r.p.m. and 80 p.s.i.g. ram pressure. The polymer was masticated for 3 minutes, then 12.0 g. of zinc stearate was added and blended for 1 minute more. 360 grams of a fumed silica having an average particle size of 7 m$\mu$ and surface area of 325 sq.m./g. was added next to four separate, equal portions at 2-minute intervals. Two minutes additional mixing completed the blending, whereupon the rotor speed was reduced to 77 r.p.m. and an additional 10 minutes of "hot" mastication was done at 160–166° C. for a total time of 24 minutes in the Banbury. The compound was then transferred to a two-roll mill operating at 71–88° C. where 24 grams of an epoxy silane ($\gamma$-glycidoxypropyltrimethoxy silane) was added. After blending, the compound was removed from the rolls and allowed to stand for 20 hours. It was then placed back on the mill where 24.0 grams each of calcium stearate and zinc oxide was added at 49–60° C. At this time, 21.0 grams of the curative, 2-mercaptoimidazoline, was added and the total compound thoroughly blended. The compound viscosity (ML+4 at 212° F.) was 62; as opposed to ca. 100 if the original polymer, silica and zinc stearate had not received the additional 10-minute hot mixing in the Banbury.

The compound was fed to a 1-inch extruder operating at 23 r.p.m. and feeding a die fitted with an eight-hole, 0.020-inch diameter by 0.080-inch land spinnerette. Extruder temperature was 93° C.; die, 121° C. The polymer exited the spinnerette at the rate of 2.54 g./min./hole and was immediately drawn down into a 16° C. water bath at 277 f.p.m. (feet per minute). Residual orientation in the filaments was removed by allowing elastic relaxation to occur as they are fed to Godet rolls revolving at 150 f.p.m. surface speed. From the Godet rolls the filaments were passed through dry talc and collected on 2⅞ O.D. paper tubes in the form of 500 denier monofilaments.

Two samples (A and B) of the thus prepared yarn were cured as follows:

Sample A: One bobbin was placed in a 2060 cc. closed container to which 2.0 grams of 2-mercaptoimidazoline had been added, not in contact with the bobbin. The container was partially vented to prevent excessive pressure buildup upon application of heat for curing.

Sample B: Handled identically except that the 2.0 grams of additional curative was not placed in the container.

Both samples were placed in a forced air oven at 171° C. for about 120 minutes and then allowed to cool slowly.

For additional comparison a sample of the original unspun composition (C) was placed in a preheated 6 in. x 6 in. x 0.30 in. steel mold and cured at 171° C. for about 45 minutes under 100 p.s.i.g. closing pressure. The difference between cure times for the steel mold and the closed containers in the air oven is due to the different rates of heat transfer for the two media.

RESULTANT PROPERTIES

| Specimen | A | B | C |
| --- | --- | --- | --- |
| Tensile strength: |  |  |  |
| Mg./d | 173 | 100 |  |
| P.s.i. | 3,300 | 1,900 | 3,220 |
| Modulus 300%: |  |  |  |
| Mg./d | 64.5 | 34.5 |  |
| P.s.i. | 1,230 | 660 | 1,280 |
| Modulus 500%: |  |  |  |
| Mg./d | 119 | 72.5 |  |
| P.s.i. | 2,280 | 1,380 | 2,380 |
| Ultimate elongation (percent) | 725 | 800 | 680 |

Specimen C was cured in the form of a sheet under conditions (gas tight mold and high pressure) which limit the possibility of curative escaping from the specimen. The test data thus indicate that the process of the invention is effective in preventing escape of the crosslinker from the filament and yielding a fiber of high quality vucanized poymer without loss in the physical properties of the polymer.

What I claim and desire to protect by Letters Patent is:

1. The process of producing an elastomeric fiber which comprises the steps of:
   (1) melt extruding an epihalohydrin polymer at a temperature of from about 100° C. to about 250° C., into a filament,
   (2) winding said extruded filament into a package, and
   (3) heating to a temperature of from about 50° C. to about 200° C. said filament package in a gaseous medium containing, in gas form, a cross-linking agent for said epihalohydrin polymer, said cross-linking agent being in addition to any that has been incorporated in said polymer prior to extrusion, said epihalohydrin polymer being a solid, amorphous polymer selected from homopolymers of an epihalohydrin and copolymers of an epihalohydrin with at least one other epoxide free of ethylenic unsaturation, said polymer having a reduced specific viscosity of at least about 0.2 when measured as a 0.1% solution in α-chloronaphthalene at 100° C., and being free of ethylenic unsaturation.

2. The process according to claim 1 wherein the agent is selected from the group consisting of ammonia, hydrogen sulfide, and polyamines and heterocyclic polyamines selected from the group consisting of 2-mercaptoimidazoline and 2-mercaptopyrimidine.

3. The process of claim 2 wherein the epihalohydrin polymer is poly(epichlorohydrin).

4. The process of claim 2 wherein the epihalohydrin polymer is a copolymer of epichlorohydrin and ethylene oxide.

5. The process of claim 2 wherein the epihalohydrin polymer is a mixture of poly(epichlorohydrin) and epichlorohydrin—ethylene oxide copolymer.

6. The process of claim 2 wherein the polyamine is diethylenetriamine.

7. The process of claim 1 where the polymer extruded in step (1) contains at least one curing agent.

8. The process of claim 7 where the curing agent is 2-mercaptoimidazoline in combination with calcium stearate.

References Cited

UNITED STATES PATENTS

| | | | |
|---|---|---|---|
| 2,891,837 | 6/1959 | Campbell | 264—184 X |
| 2,961,290 | 11/1960 | Kolb | 264—184 X |
| 3,026,270 | 3/1962 | Robinson. | |
| 3,139,657 | 7/1964 | Maly | 264—83 X |
| 3,158,580 | 11/1964 | Vandenberg | 260—33.8 X |
| 3,198,868 | 8/1965 | Pedretti et al. | 264—236 X |
| 3,233,026 | 2/1966 | Richter et al. | |
| 3,242,244 | 3/1966 | Maly. | |
| 3,285,893 | 11/1966 | Vandenberg. | |
| 3,351,517 | 11/1966 | Willis. | |
| 3,361,724 | 1/1968 | Watson et al. | 264—184 X |

JULIUS FROME, *Primary Examiner.*

J. H. WOO, *Assistant Examiner.*

U.S. Cl. X.R.

260—2; 264—83, 176, 347